(12) United States Patent
Nanni (10) Patent No.: US 6,630,938 B1
(45) Date of Patent: Oct. 7, 2003

(54) IMAGE CALIBRATION

(75) Inventor: Richard A. Nanni, Benzunin, MI (US)

(73) Assignee: Impact Imaging, Inc., Columbia, MD (US)

( * ) Notice: Subject to any disclaimer, the term of this patent is extended or adjusted under 35 U.S.C. 154(b) by 0 days.

(21) Appl. No.: 09/565,383

(22) Filed: May 5, 2000

Related U.S. Application Data (60) Provisional application No. 60/133,125, filed on May 7, 1999.

(51) Int. Cl.[7] .................................................. G09G 5/00
(52) U.S. Cl. .................... 345/629; 345/660; 358/406
(58) Field of Search ................................. 345/629, 631, 345/660, 667, 668; 382/294; 358/406

(56) References Cited

U.S. PATENT DOCUMENTS

| | | | | |
|---|---|---|---|---|
| 5,398,684 A | * | 3/1995 | Hardy | 128/653.1 |
| 5,561,459 A | * | 10/1996 | Stokes et al. | 348/180 |
| 5,565,897 A | * | 10/1996 | Kikinis et al. | 345/213 |
| 6,226,419 B1 | * | 5/2001 | Lodwick et al. | 382/294 |
| 6,285,349 B1 | * | 9/2001 | Smith | 345/589 |

* cited by examiner

*Primary Examiner*—Matthew Luu
(74) *Attorney, Agent, or Firm*—McGuireWoods LLP (57) ABSTRACT

Image calibration is performed for an image display apparatus. A known image is scanned with the image scanning apparatus using a first scanning resolution of the image scanning apparatus to obtain a scanned known image. The scanned known image is displayed on the image display apparatus using the first scanning resolution as a displayed known image. The image display apparatus is adjusted such that the displayed known image is an exact replica of the known image.

19 Claims, 9 Drawing Sheets

IMAGE CALIBRATION

CROSS-REFERENCE TO RELATED APPLICATIONS

This application claims the priority of U.S. Provisional Patent Application No. 60/133,125 filed May 7, 1999, which is incorporated herein by reference.

BACKGROUND OF THE INVENTION

1. Field of the Invention

The invention generally relates to image processing and display, and specifically relates to calibrating an image for display on an image display apparatus.

2. Background of the Invention

In many applications that use a monitor, for example, medical diagnostics and industrial imaging, image resolution is very important for performing the desired task (e.g., diagnosing a disease, such as cancer, or a bone fracture in an x-ray, or determining if a machine part is acceptable or defective).

Conventionally, a video graphic array (VGA) monitor uses an aspect ratio (i.e., a width-to-height ratio of an image) of 1.3333333333:1. This aspect ratio results in an image being displayed on a monitor at one of a number of preset resolutions. The resolution of a monitor refers to the fineness of detail attainable by the monitor in producing the image. For a particular monitor, the number of dots, or pixels, is determined by the graphics mode and video adapter of the monitor, but the size of the display depends on the size and adjustment of the monitor. The resolution of a monitor is in terms of the number of dots, or pixels, displayed horizontally and vertically. The resolution of a monitor can also be provided in dots per inch (DPI), which refers to the number of dots, or pixels, that the monitor can display in a linear inch. For example, the resolution of a monitor in (dots$^2$) could be: 640 dots×480 dots, 800 dots×600 dots, 1024 dots×768 dots, 1224 dots×918 dots, 1600 dots×1200 dots, and 2048 dots×1536 dots. Other ratios are also possible, either in landscape mode or portrait mode of the monitor. However, the aspect ratio of the monitor remains the same.

Medical monitors and high-definition television (HDTV) monitors may have aspect ratios other than 1.33333333:1 and may have other resolutions than those listed above. For example, a medical monitor may have a display resolution of 2048 dots×2048 dots at 150 DPI and an aspect ratio of 1:1. An image, displayed on a monitor having 150 DPI, has approximately 7.3% of the fineness of detail of a 35-mm film, which has a fineness of detail of approximately 2048 DPI.

Additionally, due to variations in aspect ratios, an image tailored to fit on one type of monitor may not fit exactly on another type of monitor simply by scaling the image. For example, an imaged scanned using one type of scanning device (e.g., a charge-coupled device [CCD] scanner or a digital camera) may support an aspect ratio different from that of a desired monitor. As a result, the image may be distorted when displayed on the desired monitor, and become even more distorted when the image is zoomed in and out.

It would be desirable to have a technique by which an image may be calibrated for display on monitors having different display characteristics.

SUMMARY OF THE INVENTION

It is an object of the invention to display an image on an image display apparatus without incurring distortion due to the scanning of the image by an image scanning apparatus.

It is an object of the invention to calibrate an image scanning apparatus and an image display apparatus such that an image displayed on the image display apparatus is the same size as the image, which is scanned by the image scanning apparatus.

The invention includes a method and an apparatus for calibrating an image display apparatus. The invention includes an image scanning apparatus and an image display apparatus which are calibrated such that a known image scanned by the image scanning apparatus is displayed on the image display apparatus in its actual size. Once the image scanning apparatus and the image display apparatus are calibrated, a desired image scanned at any scanning resolutin and stored in a computer-readable medium. The scanned desired image can be displayed on the image display apparatus such that a 1×(100%) zoom results in features of the displayed desired image having the same size as those in the desired image.

The invention includes a method for calibrating an image display apparatus with an image scanning apparatus comprising the steps of: determining a resolution of the image display apparatus; adjusting a resolution of the image scanning apparatus to the resolution of the image display apparatus; scanning a known image with the image scanning apparatus using a first scanning resolution to obtain a scanned known image; obtaining an overlay image of the known image; displaying the scanned known image on the image display apparatus as a displayed known image; placing the overlay image on the image display apparatus; and adjusting the image display apparatus such that the displayed known image is the same size as the overlay image.

The invention includes a method for displaying a desired image on an image display apparatus, comprising the steps of: determining a screen area of the image display apparatus; scanning the desired image using a second scanning resolution to obtain a scanned desired image, wherein the second scanning resolution is different than a first scanning resolution used to calibrate the image display apparatus; determining a new screen area for the scanned desired image; determining a fill area for the image display apparatus; and displaying both the scanned desired image as a displayed desired image and the fill area on the image displays apparatus.

The invention includes an apparatus for calibrating an image display apparatus with an image scanning apparatus, comprising: means for scanning a known image with the image scanning apparatus using a first scanning resolution of the image scanning apparatus to obtain a scanned known image; means for displaying the scanned known image on the image display apparatus using the first scanning resolution as a displayed known image; and means for adjusting the image display apparatus such that the displayed known image is an exact replica of the known image.

The invention includes an apparatus for displaying a desired image on an image display apparatus, comprising: means for determining a screen area of the image display apparatus; means scanning the desired image using a second scanning resolution to obtain a scanned desired image, wherein the second scanning resolution is different than a first scanning resolution used to calibrate the image display apparatus; means for determining a new screen area for the scanned desired image; means for determining a fill area for the image display apparatus; and means for displaying both the scanned desired image as a displayed desired image and the fill area on the image displays apparatus.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

These and other objects and features of the invention are discussed in further detail in conjunction with the drawings, where the same reference numerals refer to the same features.

DETAILED DESCRIPTION OF THE INVENTION

In describing the invention, the following definitions are applicable throughout. Further, all examples described herein are non-limiting examples.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a microcomputer; a server; an interactive television; and a hybrid combination of a computer and an interactive television. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

An "image display apparatus" refers to a device for displaying an image. Examples of an image display apparatus include: a monitor, a television monitor, a computer monitor, a medical imaging display, a liquid crystal display, a plasma flat screen display, a holographic display, an electron tube, a cathode ray tube, and a trinitron tube.

An "image scanning apparatus" refers to a device that generates image data from scanning an image. Examples of an image scanning apparatus include: a scanner, such as a CCD scanner, a flat bed scanner, an image scanner; a digital camera; a video camera; a computer-aided tomography system; and a magnetic resonance imaging system.

An "image" refers to an opaque, transparent, and/or translucent object, document, a film (for example, an x-ray film), and/or photograph. An image is not restricted as to the distance from an image scanning apparatus.

Abbreviations used in the discussion of the invention are defined as follows:

SF=screen format;
DPI=dots per inch (dots/inch);
DR=display resolution (dots$^2$);
SA=screen area (inch$^2$);
NSA=new screen area (inch$^2$);
FSR=first scanning resolution (dots$^2$);
SSR=second scanning resolution (dots$^2$);
n=a multiple of SSR to FSR;
FA=fill area (inch$^2$).

Figure 1:
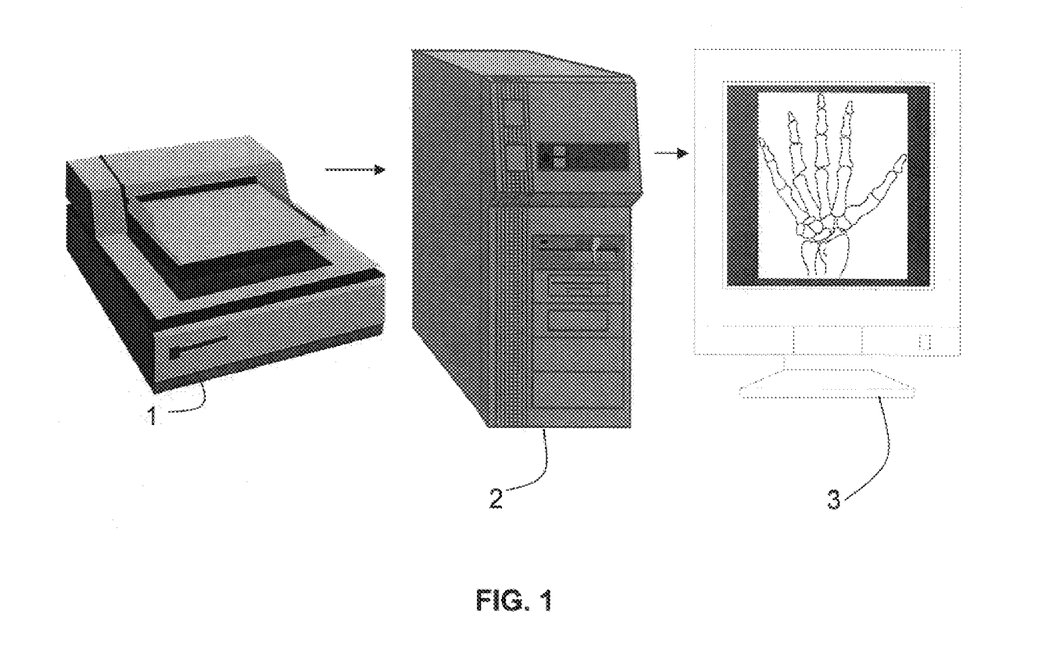
FIG. 1 illustrates a general system for implementing the invention.

FIG. 1 illustrates a general system for implementing the invention. An image scanning apparatus 1 scans an image and generates image data. The image data is provided to a computer 2, which prepares the image data using software and/or firmware and/or hardware for display on an image display apparatus 3. The image display apparatus 3 has a screen and displays the image on the screen as a displayed image.

Figure 2:
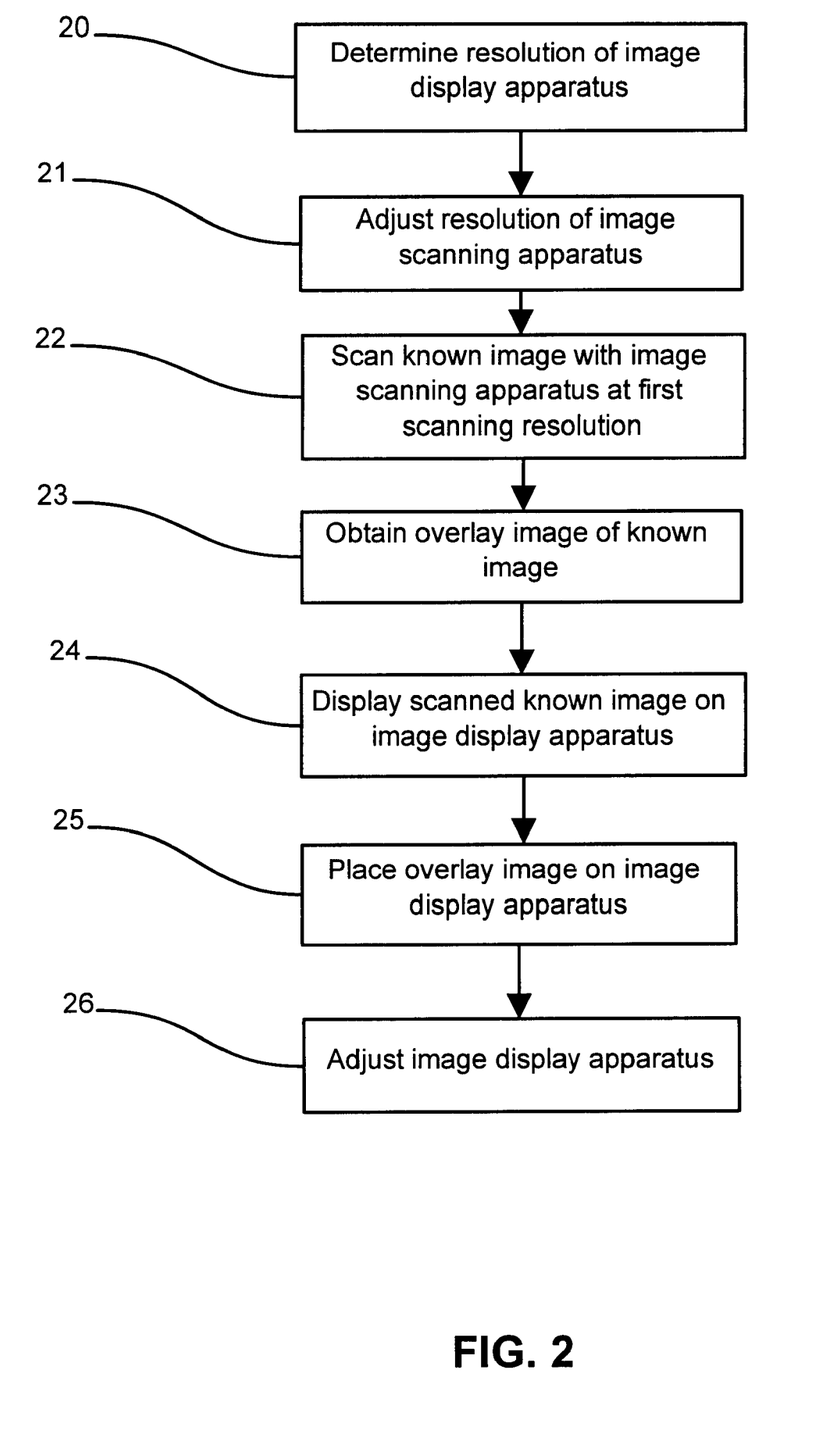
FIG. 2 illustrates a flow diagram for calibrating an image display apparatus.

FIG. 2 illustrates a flow diagram for calibrating an image display apparatus. In block 20, the resolution of the image display apparatus 3 is determined. The resolution of the image display apparatus 3 is determined in pixels or dots over a defined area. For example, the resolution of the image display apparatus 3 is determined as the number of dots displayed horizontally and vertically or as the number of DPI. The resolution of the image display apparatus 3 can usually be determined from product specifications of the image display apparatus 3.

In block 21, the resolution of the image scanning apparatus 1 is adjusted to a first scanning resolution to match the resolution of the image display apparatus 3 or an integer multiple of the resolution of the image display apparatus 3. The adjustment of the image scanning apparatus 1 can be performed via the computer 2 using software provided by the manufacturer of the image scanning apparatus 1. Alternatively, the image scanning apparatus 1 may be adjustable manually.

In block 22, a known image is scanned by the image scanning apparatus 1 at the first scanning resolution to obtain a scanned known image. Image data corresponding to the scanned known image is stored on a computer-readable medium of the computer 2. The known image is preferably a square, such as a 3"×3" square or a 6"×6" square. Alternatively, the known image can be any picture or geometrical design that is not larger than the screen of the image display apparatus 3.

In block 23, an overlay image of the known image is obtained. The overlay image is preferably plastic. In one embodiment, the overlay image is obtained by photocopying the known image onto a transparency using a photocopy machine set to 100% size reproduction (i.e., 1×zoom).

Figure 3:
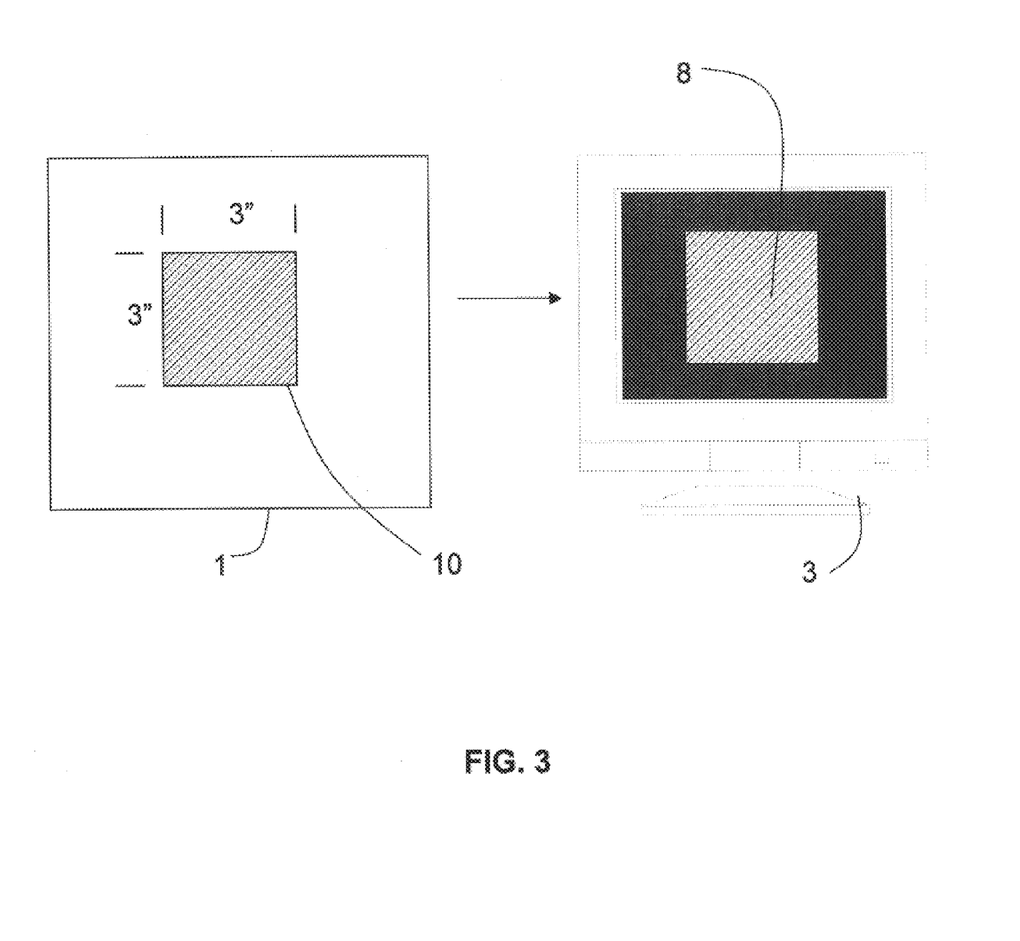
FIG. 3 illustrates displaying a known image on an image display apparatus.

In block 24, the scanned known image is displayed on the screen of the image display apparatus 3 as a displayed known image. FIG. 3 illustrates displaying a known image on an image display apparatus. A known image 10 is a 3"×3" square and is scanned by the image scanning apparatus 1. Via processing by the computer 2 (not shown in FIG. 3), the scanned known image is displayed as a displayed known image 8 on the image display apparatus 3. Preferably, the displayed known image is displayed as approximately centered in the screen of the image display apparatus 3 to provide generally better results in calibrating of the image display apparatus 3.

Figure 4:
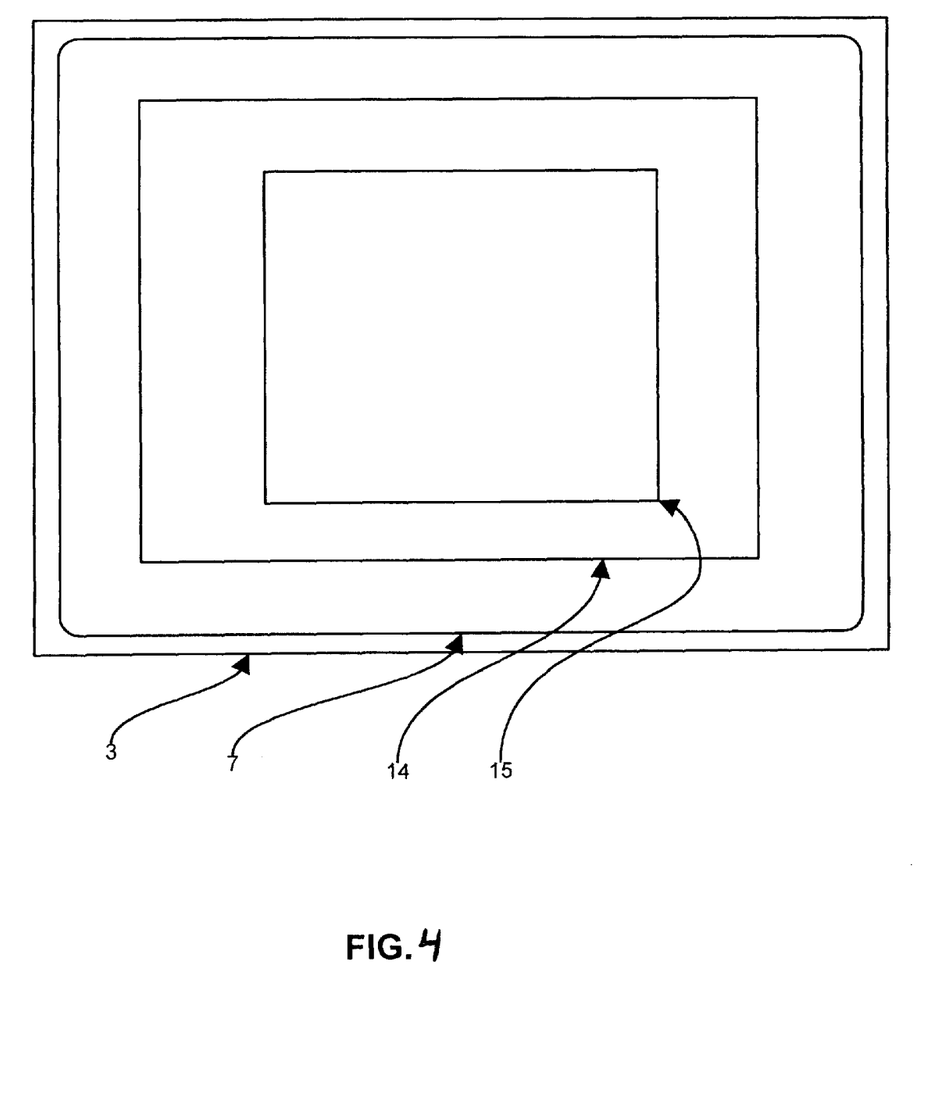
FIG. 4 illustrates an overlay image and an image display apparatus.

In block 25, the overlay image is physically placed on the screen display of the image apparatus 3. FIG. 4 illustrates an overlay image 14 and an image display apparatus 3. The overlay image 14 is physically placed on the screen 7 of the image display apparatus 3. The overlay image 14 includes a square 15.

In block 26, the image display apparatus 3 is adjusted such that the displayed known image is the same size as that of the overlay image. The overlay image is compared to the displayed known image 8. If the overlay image is smaller than the displayed known image 8, the image display apparatus 3 is adjusted to decrease the size of the displayed known image 8. Conversely, if the overlay image is larger than the displayed known image 8, the image display apparatus 3 is adjusted to increase the size of the displayed known image 8. The image display apparatus 3 is calibrated when the displayed known image is the same size as the overlay image.

The image display apparatus 3 is preferably adjusted by manipulating electronic control features integral with the image display apparatus 3. The electronic control features of the image display apparatus 3 can be adjusted manually or via the computer 2 and software. Alternatively, the image display apparatus 3 can be adjusted via the computer 2 and software provided by the manufacturer of the image display apparatus 3. In whatever manner is selected to adjust the image display apparatus 3, the image display apparatus 3 is adjusted until the displayed known image is the same size as the overlay image.

Further, if the image scanning apparatus 1 is adjusted to an integer multiple of the image display apparatus 3, the displayed known image must be scaled to the same integer multiple to obtain an accurate comparison between the displayed known image and the scanned known image.

Figure 5:
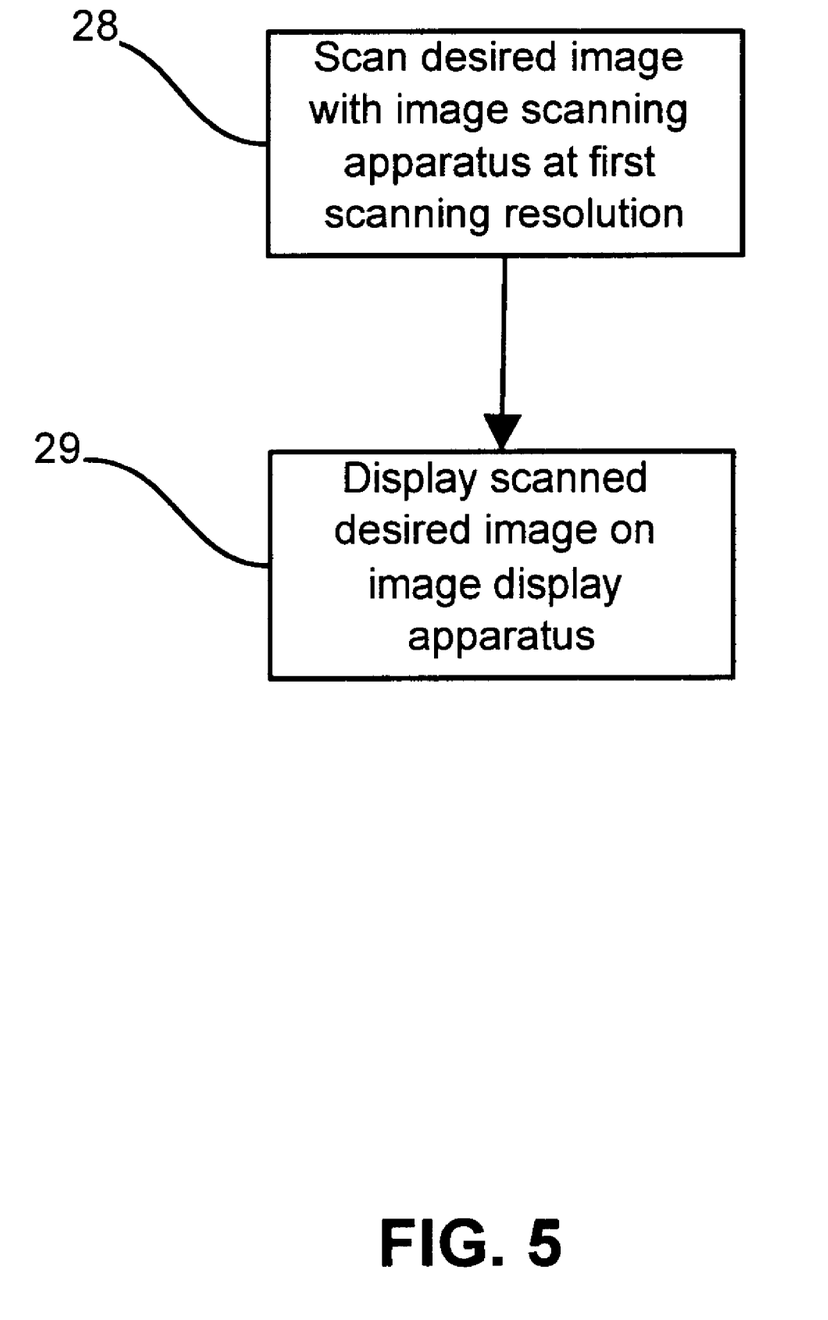
FIG. 5 illustrates a flow diagram for displaying a desired image at a first scanning resolution.

FIG. 5 illustrates a flow diagram for displaying a desired image at a first scanning resolution. Once the image display apparatus 1 has been calibrated as per the invention as illustrated in FIG. 2, a desired image scanned at the first scanning resolution can be displayed on the image display apparatus 3 as the same size as the desired image.

In block 28, a desired image is scanned with the image scanning apparatus 1 at the first scanning resolution to obtain a scanned desired image. Block 28 is performed in the same manner as block 22, except a desired image is scanned by the image scanning apparatus.

In block 29, the scanned desired image is displayed on the screen of the image display apparatus as a displayed desired image. The displayed desired image is the same size as the desired image. Moreover, measurements can be taken of the displayed desired image as if the measurements were taken of the desired image. This is particularly useful for measuring, for example, and then diagnosing a scanned x-ray. Further, if the displayed desired image is zoomed in or zoomed out, the zoomed displayed desired image is an exact scaled version of the desired image.

Figure 6:
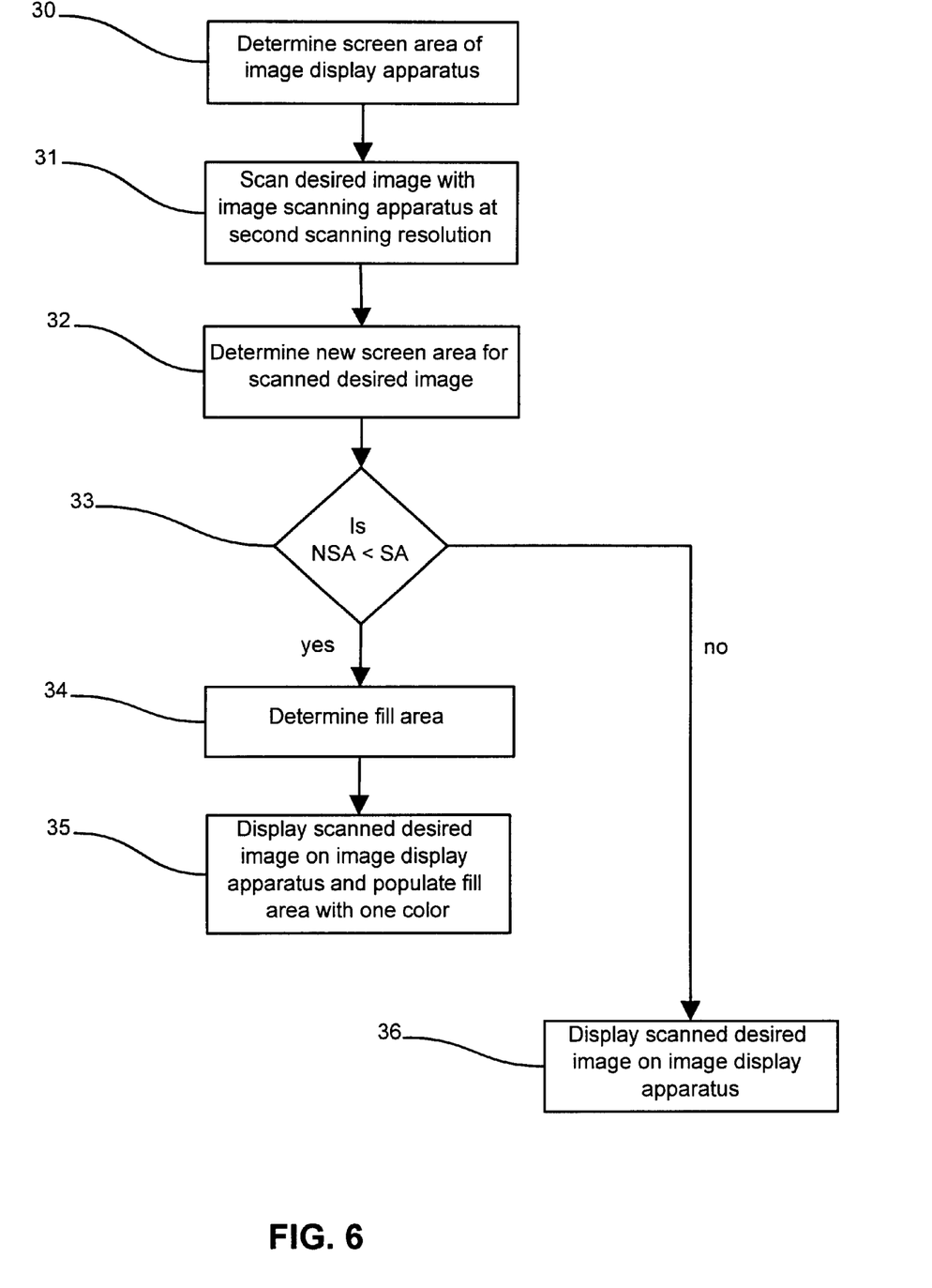
FIG. 6 illustrates a flow diagram for displaying a desired image at a second scanning resolution.

FIG. 6 illustrates a flow diagram for displaying a desired image at a second scanning resolution. The image display apparatus 3 is assumed to be calibrated with a first scanning resolution using the invention as illustrated in FIG. 2.

In block 30, a screen area SA of the calibrated image display apparatus 3 is determined by the following equation:

$$SA = DR/DPI \qquad (1)$$

The display resolution DR in (dots$^2$) of the image display apparatus 3 is divided by the dots per inch DPI of the image display apparatus 3, which in two dimensions is (dots$^2$)/(inches$^2$) to produce the screen area SA in (inches$^2$) of the image display apparatus 3. The display resolution DR of the image display apparatus 3 is determined as in block 20.

In block 31, a desired image is scanned with the image scanning apparatus 1 at a second scanning resolution, different from the first scanning resolution, to obtain a scanned desired image.

In block 32, a new screen area NSA is determined for the image display apparatus 3 by the following equation:

$$NSA = SA/n \qquad (2)$$

where $$n = SSR/FSR \qquad (3)$$

The screen area SA in (inches$^2$) of the image display apparatus 3 is divided by the multiple n of the second scanning resolution SSR to the first scanning resolution FSR to determine the new screen area NSA in (inches$^2$) of the scanned desired image. The multiple n is a positive number. If the second scanning resolution SSR is greater than the first scanning resolution FSR, the multiple n is greater than one. If the second scanning resolution SSR is less than the first scanning resolution FSR, the multiple n is between zero and one.

In block 33, the new screen area NSA is compared to the screen area SA. If the new screen area NSA is less than the screen area SA, flow proceeds to block 34. Otherwise, flow proceeds to block 36.

In block 34, a fill area is determined for displaying the scanned desired image with the following equation:

$$FA = SA - NSA \qquad (4)$$

The fill area FA in (inches$^2$) is determined from the difference between the screen area SA of the image display apparatus 3 for the first scanning resolution and the new screen area NSA of the image display apparatus 3 for the second scanning resolution.

Because the new screen area NSA for the second scanning resolution is smaller than the screen area SA for the first scanning resolution, and if the scanned desired image were displayed with the image display apparatus 3 as a displayed desired image, the displayed desired image would not be an exact size replica of the desired image and would be distorted because of a difference between the second scanning resolution and the first scanning resolution, which was used to calibrate the image display apparatus 1. One way to avoid this distortion would be to re-calibrate the image display apparatus to the second scanning resolution.

With the invention, however, additional re-calibration is not needed, and a fill area is generated to maintain the aspect ratios between the image scanning apparatus 1 and image display apparatus 3. Through the use of the fill area FA, the invention alleviates the problem of potential distortion by using a second scanning resolution. The fill area corresponds to the space of the screen of the image display apparatus unoccupied by the displayed desired image. With the fill area of the invention, the image display apparatus 3 does not need to be re-calibrated to preserve the exact ratio between the displayed desired image and the desired image, which is scanned at the second scanning resolution. The fill area also preserves the ratio between the calibrated image display apparatus 3 and the image scanning apparatus 1.

Figure 7:
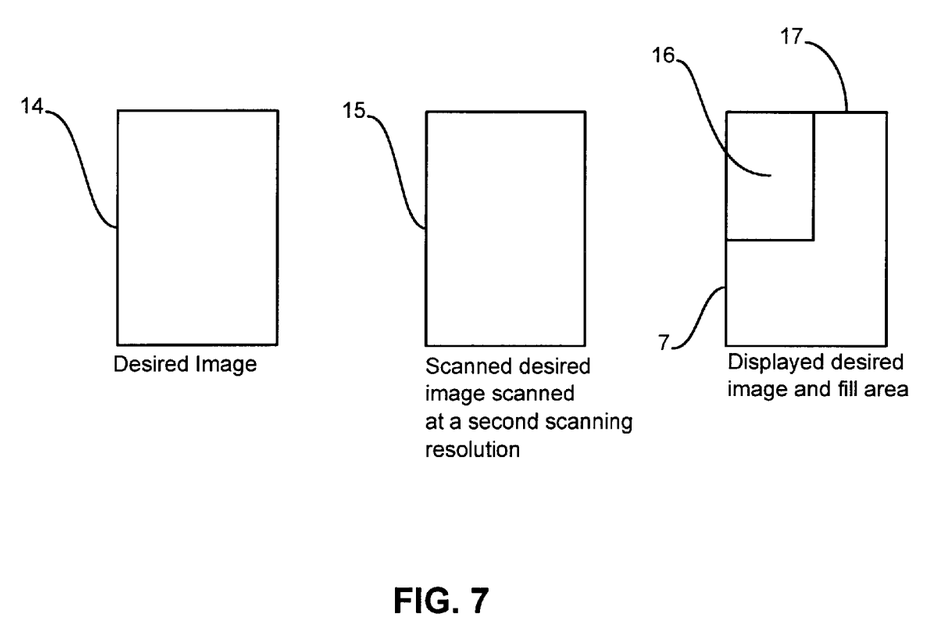
FIG. 7 illustrates a desired image, a scanned desired image, and a displayed desired image.

FIG. 7 illustrates a desired image, a scanned desired image, and a displayed desired image. A desired image 14 is scanned as in block 31 at the second scanning resolution to obtain the scanned desired image 15. The displayed desired image 16 and the fill area 17 are displayed on the screen 7 of the image display apparatus 3.

Referring back to FIG. 5, in block 35, the scanned desired image is displayed on the screen of the image display apparatus 3 and the fill area is populated with on color. The displayed desired image is preferably located in the top left of the screen, as illustrated in FIG. 7. Preferably, the fill area is populated with the color black, and the value for the fill area is such that the fill area is displayed as the color black. For example, depending on the color palette for displaying the displayed desired image, the value zero corresponds to displaying the color black. As an option, a different color or multiple colors can be used for the fill area depending on a desired contrast or compliment to the displayed desired image.

Further, the ratio between the size of the displayed desired image and the size of the desired image is equal to the ratio of the second scanning resolution to the first scanning resolution. Hence, the displayed desired image can be enlarged by the multiple of the second scanning resolution to the first scanning resolution to obtain the same size as the desired image.

In block 36, the new screen area NSA is not less than the screen area SA, and the scanned desired image is displayed on the screen of the image display apparatus 3 as a displayed desired image. Because the new screen area NSA is not less than the screen area SA, the scanned desired image is too large to be displayed all at once on the screen of the image display apparatus 3, and the displayed desired image is an exact scaled portion of the desired image. The displayed desired image is viewed by, for example, scrolling the displayed desired image.

Further, the ratio between the size of the displayed desired image and the size of the desired image is equal to the ratio of the second scanning resolution to the first scanning resolution. Hence, the displayed desired image can be reduced by the multiple of the second scanning resolution to the first scanning resolution to obtain the same size as the desired image.

Figure 8:
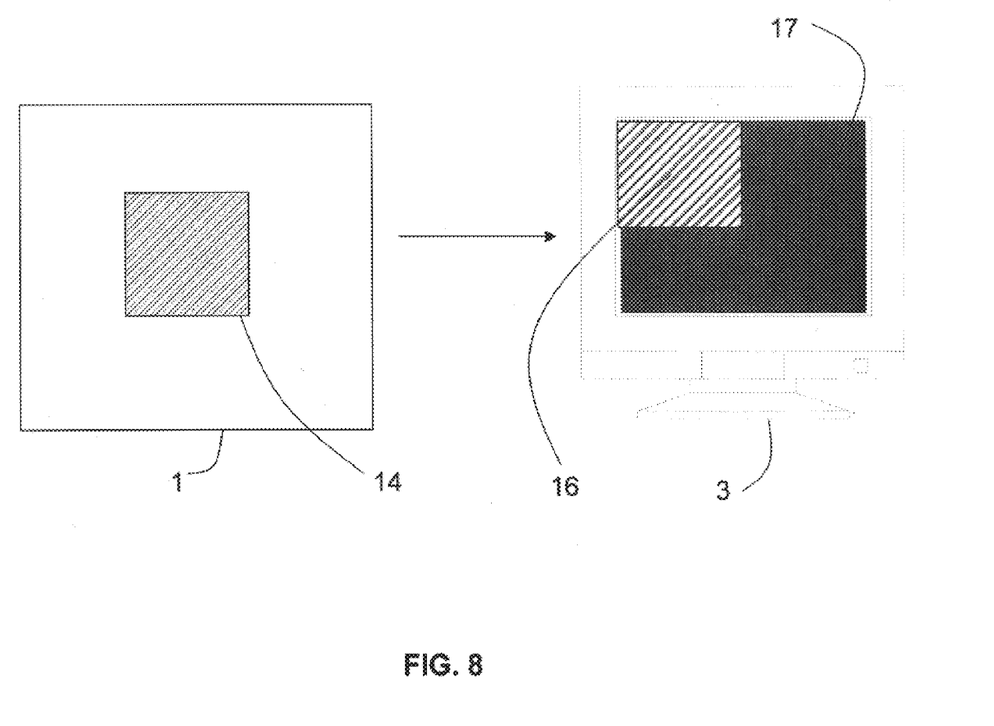
FIG. 8 illustrates displaying a desired image on an image display apparatus.
Figure 9:
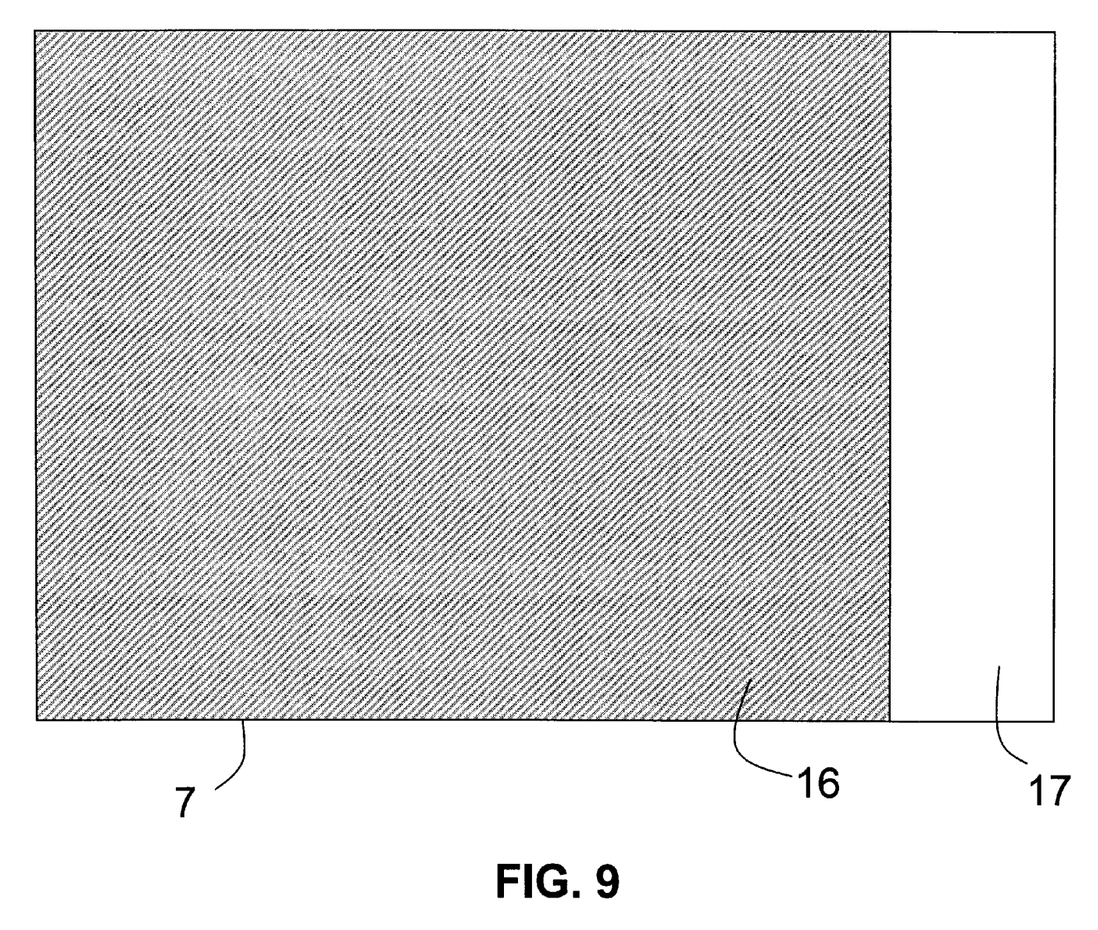
FIG. 9 illustrates a displaying a desired image on an image display apparatus.

FIGS. 8 and 9 illustrate displaying a desired image on an image display apparatus when the new screen area NSA for the second scanning resolution is smaller than the screen area SA for the first scanning resolution. A desired image is scanned by an image scanning apparatus 1 to obtain a scanned desired image. Via a computer 2 (not shown in FIGS. 8 and 9), the scanned desired image is displayed as a displayed desired image 16, along with fill area 17, on the image display apparatus 3.

The following examples illustrate the invention. The first example illustrates calibrating the image display apparatus; and the second example illustrates scanning a desired image at a second scanning resolution.

EXAMPLE 1

Assume that the image display apparatus 3 is in a landscape mode and has a high-resolution display adapter capable of displaying an image at DR=2048 dots×1536 dots with 120 DPI resolution. As in block 20, the resolution of the image display apparatus 3 is initially determined. As in blocks 21–22, a known image is chosen as a 6"×6" square and is scanned by the image scanning apparatus to obtain a scanned known image. As in blocks 23–25, an overlay image is obtained, the scanned known image is displayed, and the overlay image is placed on the image display apparatus 3.

As in block 26, the image display apparatus 3 is adjusted by comparing the displayed known image and overlay image. For example, the lines around the perimeter of the square should be the same length and thickness as that of the 6"×6" square, and the square should be exactly square (i.e., have four right angles). If not, the image display apparatus 3 is adjusted such that the displayed known image is the same size as the overlay image. By adjusting the image display apparatus 3 in the manner of the invention, the image display apparatus displays the scanned desired image at 120 DPI over an area of 17.07"×12.80", and the desired image and displayed desired image have an exact 1:1 ratio.

EXAMPLE 2

Consider an image display apparatus having an aspect ration of 1.3333333333:1 (i.e., a screen format SF of 1.3333333333) and the following characteristics: DPI=72 (a standard value for computer monitors, for example), DR=1024 dots×768 dots, SA=14.22"×10.66", and a first scanning resolution FSR=72 DPI. The display resolution DR is divided by the screen DPI, which gives the screen area SA of the scanned desired image scanned at a first scanning resolution according to equation (1).

If it is desirable to scan at a second scanning resolution SSR, the new screen area NSA of the scanned desired image scanned at the second scanning resolution is determined by dividing the present value of the screen area SA by the value by which the first scanning resolution FSR is multiplied to get the second scanning resolution SSR according to equations (2) and (3).

In doubling the first scanning resolution FSR=72 DPI to the second scanning resolution SSR=144 DPI, the new screen area NSA is obtained according to equations (2) and (3) by dividing SA=14.22"×10.66" by 2. This operation provides the new screen area NSA of the scanned desired image scanned at the second scanning resolution as NSA= 7.11"×5.33".

Consequently, the scanned desired image is smaller than the desired image. In accordance with the invention, the computer 2 displays the displayed desired image with the following parameters: DR=1024 dots×768 dots; and DPI= 144 dots per inch. Additionally, the computer 2 includes the fill area FA=0.33 (inches$^2$) determined according to equation (4). The additional fill area FA preserves the ratio between the displayed desired image and the desired image, and hence preserves the initial calibration of the image display apparatus 1. With the invention, the ratio between the desired image and the displayed desired image is an exact 2:1 ratio.

With the invention, exact measurements can be made on the image display apparatus of a desired image, regardless of the scanning resolution of the desired image, because the image display apparatus 3 is calibrated according to the invention. This can be advantageous in many applications. For example, a physician may wish to remotely view an x-ray image. If the physician's image display apparatus is calibrated using the invention, the physician is able to not only view the x-ray image but also make accurate measurements of features in the x-ray image.

The invention has been described in detail with respect to preferred embodiments, and it will new be apparent form the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method for calibrating an image display apparatus with an image scanning apparatus, comprising the steps of:
   determining a resolution of the image display apparatus;
   adjusting a resolution of the image scanning apparatus to the resolution of the image display apparatus;
   scanning a known image with the image scanning apparatus using a first scanning resolution to obtain a scanned known image;
   obtaining an overlay image of the known image;
   displaying the scanned known image on the image display apparatus as a displayed known image;
   placing the overlay image on the image display apparatus; and
   adjusting the image display apparatus such that the displayed known image is the same size as the overlay image.

2. A method according to claim 1, further comprising the steps of:
   scanning a desired image with the image scanning apparatus using the first scanning resolution to obtain a scanned desired image; and
   displaying the scanned desired image on the image display apparatus as a displayed desired image.

3. A method according to claim 2, further comprising the step of making a measurement of the displayed desired image, wherein the measurement of the displayed desired image is equal to a similar measurement of the desired image.

4. A method according to claim 2, further comprising at least one of zooming in or zooming out using the displayed desired image to obtain a zoomed in displayed desired image or a zoomed out displayed desired image, respectively, wherein the zoomed in displayed image is a proportionately reduced version of the displayed desired image, and the zoomed out displayed desired image is a proportionately enlarged version of the displayed desired image.

5. A method according to claim 1, further comprising the steps of:
   determining a screen area of the image display apparatus;
   scanning a desired image using a second scanning resolution to obtain a scanned desired image, wherein the second scanning resolution is different than the first scanning resolution;
   determining a new screen area for the image display apparatus;
   determining a fill area for the image display apparatus;
   displaying both the scanned desired image as a displayed desired image and the fill area on the image displays apparatus.

6. A method according to claim 5, wherein the screen area of the image display apparatus is determined using:

$$SA = DR/DPI$$

wherein SA is the screen area in (inches$^2$) of the scanned desired image, DR is a display resolution in (dots$^2$) of the image display apparatus, and DPI is a screen dots per inch of the image display apparatus.

7. A method according to claim 5, wherein the new screen area of the image display apparatus is determined using:

$$NSA = SA/n, \text{ and}$$

$$n = SSR/FSR$$

wherein NSA is the new screen area of the image display apparatus, SA is the screen area of the image display apparatus, SSR is the second scanning resolution of the desired image, and FSR is the first scanning resolution of the known image.

8. A method according to claim 5, wherein the fill area is determined using:

$$FA = SA - NSA$$

wherein FA is the fill area, NSA is the new screen area of the image display apparatus, and SA is the screen area of the image display apparatus.

9. A method according to claim 5, wherein the fill area is one color.

10. A method according to claim 5, wherein the fill area is black.

11. A method according to claim 5, wherein the fill area is a display space of the image display apparatus unused by the displayed desired image.

12. A method according to claim 1, wherein the known image is a predetermined shape with known dimensions.

13. A method according to claim 12, wherein the predetermined shape is a square.

14. A method for displaying a desired image on an image display apparatus, comprising the steps of:
   determining a screen area of the image display apparatus;
   scanning the desired image using a second scanning resolution to obtain a scanned desired image, wherein the second scanning resolution is different than a first scanning resolution used to calibrate the image display apparatus;
   determining a new screen area for the image display apparatus;
   determining a fill area for the image display apparatus; and
   displaying both the scanned desired image as a displayed desired image and the fill area on the image displays apparatus.

15. A method according to claim 14, wherein the screen area of the image display apparatus is determined using:

$$SA = DR/DPI$$

wherein SA is the screen area in (inches$^2$) of the scanned desired image, DR is a display resolution in (dots$^2$) of the image display apparatus, and DPI is a screen dots per inch of the image display apparatus.

16. A method according to claim 14, wherein the new screen area of the image display apparatus is determined using:

$$NSA = SA/n, \text{ and}$$

$$n = SSR/FSR$$

wherein NSA is the new screen area of the image display apparatus, SA is the screen area of the image display apparatus, SSR is the second scanning resolution of the desired image, and FSR is the first scanning resolution of the known image.

17. A method according to claim 14, wherein the fill area is determined using:

$$FA = SA - NSA$$

wherein FA is the fill area, NSA is the new screen area of the image display apparatus, and SA is the screen area of the image display apparatus.

18. An apparatus for calibrating an image display apparatus with an image scanning apparatus, comprising:

means for scanning a known image with the image scanning apparatus using a first scanning resolution of the image scanning apparatus to obtain a scanned known image;

means for displaying the scanned known image on the image display apparatus using the first scanning resolution as a displayed known image; and means for adjusting the image display apparatus by placing an overlay image of the known image on the image display apparatus such that the displayed known image is the same size as the known image.

19. An apparatus for displaying a desired image on an image display apparatus, comprising:

means for determining a screen area of the image display apparatus;

means scanning the desired image using a second scanning resolution to obtain a scanned desired image, wherein the second scanning resolution is different than a first scanning resolution used to calibrate the image display apparatus;

means for determining a new screen area for the image display apparatus;

means for determining a fill area for the image display apparatus; and means for displaying both the scanned desired image as a displayed desired image and the fill area on the image displays apparatus.

* * * * *